United States Patent [19]

Love et al.

[11] Patent Number: 5,058,329

[45] Date of Patent: Oct. 22, 1991

[54] MACHINE AND METHOD TO ENHANCE FABRIC

[75] Inventors: Franklin S. Love, Columbus, N.C.; Joseph E. Rumler, Chesnee, S.C.

[73] Assignee: Milliken Research Corporation, Spartanburg, S.C.

[21] Appl. No.: 516,574

[22] Filed: Apr. 30, 1990

Related U.S. Application Data

[62] Division of Ser. No. 461,687, Jan. 8, 1990.

[51] Int. Cl.[5] .................... B32B 27/02

[52] U.S. Cl. .................... 51/323; 51/75; 26/28

[58] Field of Search .......... 8/132, 152, 159, DIG. 3; 28/162, 245, 246, 58, 259; 51/2 L, 20, 74 R, 75, 39, 78, 323, 295; 26/28, 86

[56] References Cited

U.S. PATENT DOCUMENTS

| | | | |
|---|---|---|---|
| 2,053,228 | 9/1936 | Platt | 26/28 |
| 2,067,632 | 1/1937 | Hodley | 26/28 |
| 2,278,879 | 4/1942 | Hunter | 51/75 |
| 2,402,689 | 6/1946 | Snow et al. | 51/75 |
| 2,617,170 | 11/1952 | Mulholland | 26/28 |
| 3,499,195 | 3/1970 | Wethington | 51/75 |
| 3,523,346 | 8/1970 | Bolen | 26/28 |
| 3,670,375 | 6/1972 | Cohn | 26/86 |
| 3,847,763 | 11/1974 | Svensson | 29/110 |
| 4,012,815 | 3/1977 | Benzoquen | 26/28 |
| 4,017,722 | 4/1977 | Swanson | 26/28 |
| 4,421,513 | 12/1983 | Tien-Kuei | 28/159 |
| 4,494,740 | 1/1985 | Noboru et al. | 270/31 |
| 4,505,720 | 3/1985 | Gabor | 51/295 |
| 4,908,046 | 3/1990 | Wiond | 51/295 |

FOREIGN PATENT DOCUMENTS

| | | | |
|---|---|---|---|
| 2900246 | 7/1979 | Fed. Rep. of Germany | 26/28 |
| 15089 | 2/1972 | Japan | 26/28 |
| 74200 | 7/1978 | Japan | 26/28 |
| 2063322 | 6/1981 | United Kingdom | 26/28 |

*Primary Examiner*—James G. Smith
*Assistant Examiner*—Blynn Shideler
*Attorney, Agent, or Firm*—Earle R. Marden; H. William Petry

[57] ABSTRACT

Method and apparatus to surface treat a web of fabric by passing it over and in contact with a rotating tungsten carbide coated roll. The selvedges of the web material are held on rotating members with pins on the periphery thereof which penetrate the fabric.

4 Claims, 3 Drawing Sheets

MACHINE AND METHOD TO ENHANCE FABRIC

This is a division of application Ser. No. 461,687 filed Jan. 8, 1990 for MACHINE AND METHOD TO ENHANCE FABRIC SURFACE CHARACTERISTICS, now pending.

This invention relates generally to a machine and method to treat the surface of a fabric to change the characteristics thereof and, in particular, to treat the surface of a woven fabric to fibrillate and/or nap the yarns in the fabric.

There are numerous machines and methods available to change the surface characteristics of a fabric but most of them lack the ability to control the amount of surface treatment and are subject to considerable downtime due to the servicing and replacement of the apparatus providing the surface treatment.

Therefore, it is an object of the invention to provide an efficent method and apparatus to provide a desired surface effect on a fabric for long periods of time without constant readjustment of the process and replacement of the fabric treatment medium.

Other objects and advantages of the invention will become readily apparent as the specification proceeds to describe the invention with reference to the accompanying drawings, in which.

Figure 1:
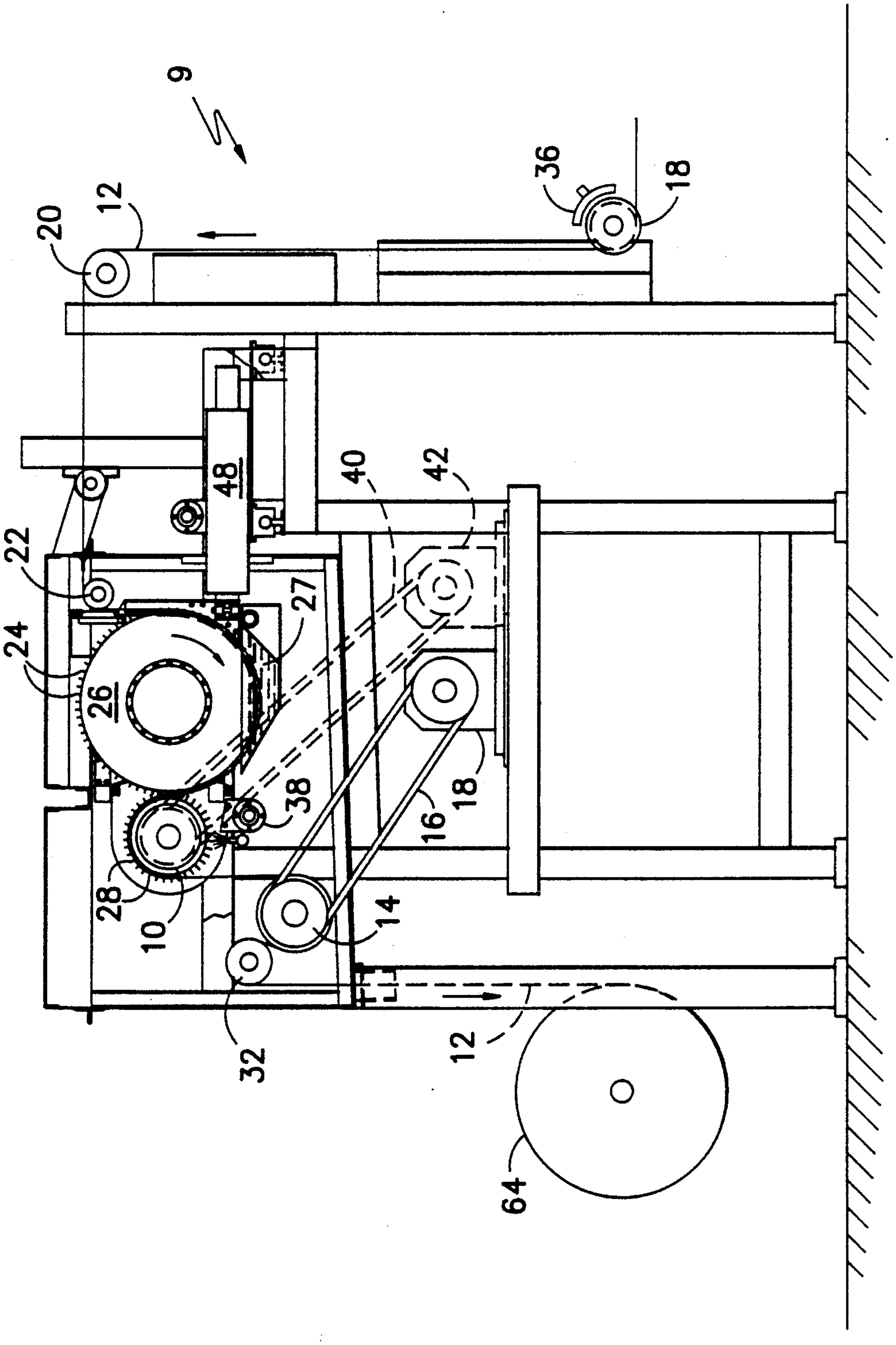
FIG. 1 is a side elevation view of the new and improved fabric treatment machine.

The new and improved machine 9 and method can be employed to surface treat most fabrics whether woven, nonwoven, knitted, etc. of synthetic filament fibers or yarns and/or natural synthetic staple yarns or blends thereof. Preferably the invention is directed to surface treatment of a woven fabric comprised substantially of all continuous filament synthetic yarn to fibrillate the surface of the yarns therein. In the case of staple fibers the machine and method provide a surface treatment which is similar to the result obtained from napping.

In the fibrillation or napping of the desired fabric a driven abrading roll 10 is employed. The abrading roll 10 is coated with a plurality of rounded tungsten-carbide particles, each with an average size of 0.0003". The coated surface of the abrading roll has the abrading effect of 600–700 grain sandpaper.

In the preferred embodiment of the invention a woven fabric 12 of 100% polyester, 70 denier, 34 filament yarn is drawn from a suppy roll (not shown) by the roll 14, driven by belt 16 from a motor 18, at a rate of 5–14 meters/minute, preferably 10 meters/minute. In its path of travel from the supply roll (not shown) to the drive roll 14, the fabric 12 passes sequentially over brake roll 18, over idler guide rolls 20 and 22, onto the pins 24 of stretch or tension discs 26 which rotates the fabric through solvent bath tray 27, onto the pins 28 of the collars 30 telescoped over the driven abrasion roll 10 and around the drive roll 14. From the drive roll 14 the treated fabric 12 passes over the idler roll 32 to the take-up roll 34. A suitable brake shoe 36 cooperates with the roll 18 to brake the action of the roll 18 when actuated.

Looking now to the fabric treatment area of the machine the fabric 12 engages the pins 24 of the tension discs 26 and is guided down though the solvent tray 27 and up to the pins 28 on the collars 30. As in the preferred form of the invention, a solvent of methylene chloride or the like is maintained in the tray 27 to swell the polyester fibers to enhance the fibrillation of the fabric by the abrading roll 10 in a manner disclosed in U.S. Pat. Nos. 4,331,724 or 4,421,513. If the fabric being treated is combined essentially of natural fibers the tray 27 will not be filled with solvent since it is not necessary to swell natural fibers.

Figure 2:
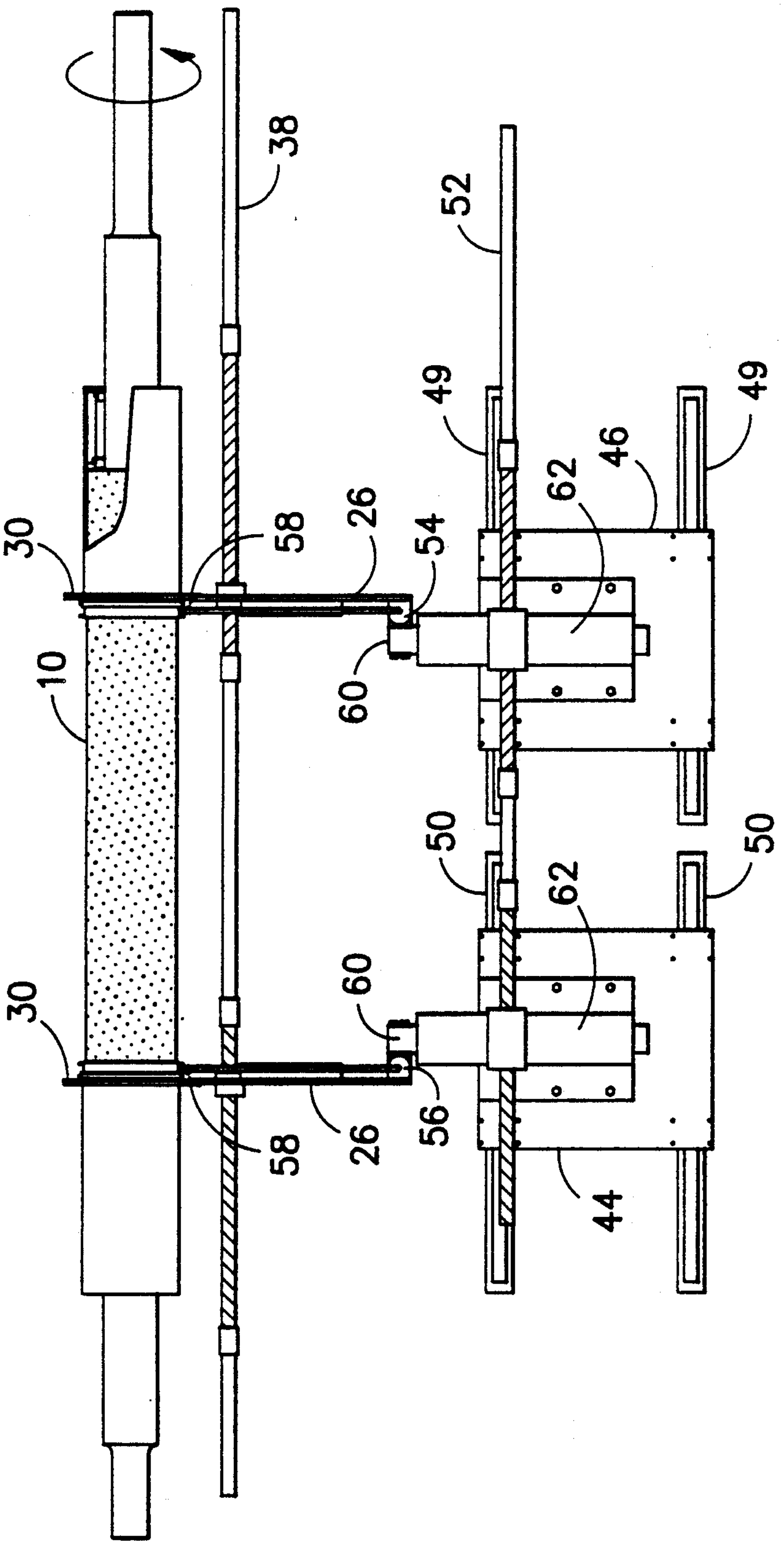
FIG. 2 is a top view of the fabric treatment mechanism.
Figure 3:
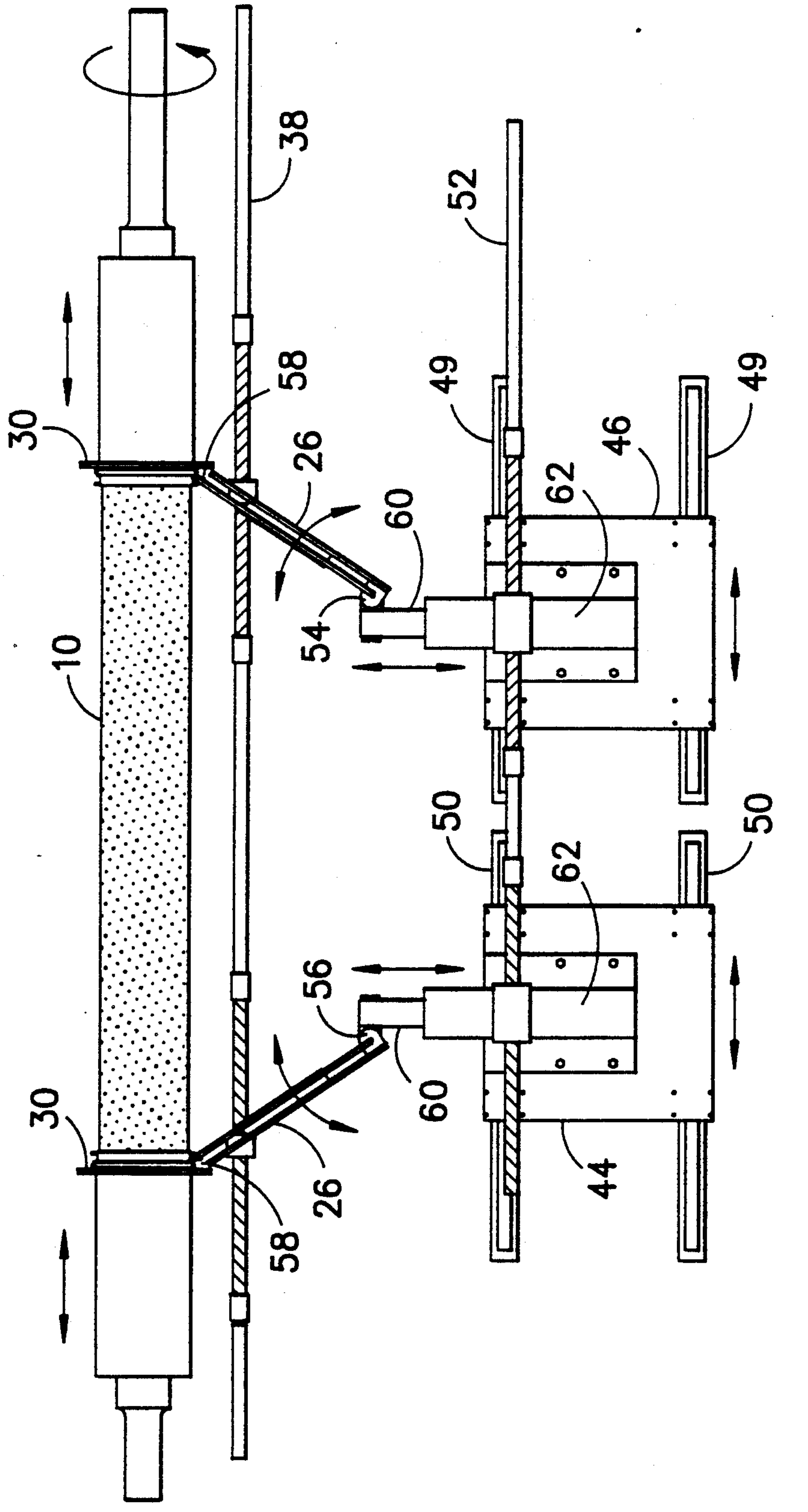
FIG. 3 is a view similar to FIG. 2 except the fabric treatment mechanism has been adjusted to place tension on the fabric in the filling direction.

FIGS. 2 and 3 are blow-up top views of the fabric treatment mechanism of the machine with the acme screw 38 being shown in front of the abrading roll 10 for purposes of illustration rather under the actual position under the roll 10 as shown in FIG. 1. As indicated the abrading roll 10 is driven by a suitable belt 40 and motor 42 at a speed of about 20–100 rpm, preferably 50 rpm, in a direction opposite to the path of travel of the fabric 12 through the machine.

FIG. 52 illustrates the position of the tension discs 26 and the collars 30 when there is no excessive stretching tension on the fabric in the weft direction and the pins 24 and 28 are merely holding the fabric as it is being abraded. FIG. 3 illustrates the position of the tension discs 26 and the collars 30 when it is desired to provide crimp interchange between the weft and the warp yarns to provide more abrasion one the warp yarns than would be provided by the position shown in FIG. 2. Conventional face finishing equipment treats primarily the filling. This invention treats either warp, filling or both. Also this invention does not damage the selvedge during treatment. As an example of the preferred polyester fabric the incoming width is about 60.5" and the outgoing width is 63.5".

To accomplish the desired effect on a particular width fabric 12 the holders 44 and 46 slid inward or outward on the slide members 49 and 50 by the acme screw 52 so that the distance between the pivot points 54 and 56 is susbtantially the width of the fabric 12 to be treated. Then the acme screw 38 is rotated to slide the collars 30 inward or outward on the abrading roll 10 depending on the desired final width. Since the tension discs 26 are pivotally connected to the collars 30 at 58, the discs 26 move with the collars 30 and the shafts 60 are slid inward or outward in the collar 62 of the holders 44 and 46 depending on the position of the collars 30.

In operation, the parameters of the desired fabric are selected. This includes selecting the type of fabric to be treated, the width of the starting fabric, the desired surface treatment and the width of the fabric during treatment. Then the position of the tension discs 26 and collars 30 is set to provide the desired effect on the selected width fabric and the tray 27 is filled with the appropriate swelling agent, if such is neccessary for the desired treatment of the fabric 12. Then the fabric to be treated is placed on the pins 24 of the tension discs and the pins 28 of the collars 30 and fed down and around the feed roll 14 and idler roll 32. Then the feed roll 14 pulls the fabric 12 from the supply roll past the abrading 10 which is rotating the direction opposite to the path of travel of the fabric 12 to abrade the under-surface thereof. Then the treated fabric 12 can be delivered to a take-up roll 64 or to a solvent removal range (not shown).

From the above description it can be seen that a machine and method have been provided which will continuously treat the surface of a fabric in a controlled manner and do not require constant replacement of the abrading roll due to the use of a tungsten carbide coated roll having a long service life.

Although the preferred embodiment of the invention has been specifically described, it is contemplated that changes may be made without departing from the scope or spirit of the invention and it is desired that the scope of the invention be limited only by the claims.

We claim:

1. The method of treating one surface of a substantially all synthetic woven fabric comprising the steps thereof:

supplying a web of synthetic fabric, passing the synthetic fabric through a bath of a swelling agent, controlling the width of the synthetic fabric and passing it into contact with an abrading roll coated with tungsten carbine, rotating the abrading roll to fibrillate the surface of the synthetic fabric and passing the fabric to a point to be collected.

2. The method of claim 1 wherein the abrading roll is rotated in a direction opposite to the path of travel of the synthetic fabric.

3. The method of claim 2 wherein the woven synthetic fabric is stretched on the abrading roll to provide crimp interchange and thereby provide more abrasion of the warp yarn than would be provided if the fabric were not stretched.

4. The woven fabric of claim 3 wherein the abraded fabric is substantially 100% polyester.

* * * * *